United States Patent Office 3,534,092
Patented Oct. 13, 1970

3,534,092
DISPIROPYRAN COMPOUNDS HAVING
PHOTOCHROMIC PROPERTIES
Rene Lucien Gautron, Sceaux, France, assignor to Compagnie de Saint-Gobain, Neuilly-sur-Seine, Seine, France
No Drawing. Filed June 7, 1966, Ser. No. 555,683
Claims priority, application France, June 23, 1965, 21,911
Int. Cl. C07d 27/38
U.S. Cl. 260—326.11       9 Claims

ABSTRACT OF THE DISCLOSURE

This invention relates to new photochromic compounds and to methods for producing them. The compounds which change color on exposure to radiation and revert to their original color on removal from radiation, contain two spiropyran groups connected to each other through the pyran group by an aromatic system which may contain one or more aromatic rings. The preferred compounds are dimethyl 3,3, indoline spiropyran derivatives.

---

This invention relates to dispiropyran compounds having photochromic properties. More particularly it relates to such compounds having a mono- or polycyclic aromatic ring system in the molecule, their preparation and use.

Numerous photochromic substances are known which are derivatives of spiropyrans as, for example, substitution products of trimethyl-1,3,3 indolin 2-spiro-2′ benzo (b) pyran having the formula:

Formula 1

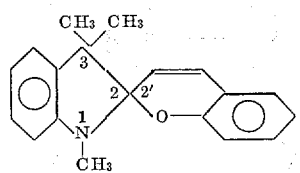

It is known that the absorption bands in the visible spectrum of the spiropyran compounds in their colored modifications are relatively narrow and only include a part of the visible spectrum; this involves the necessity at times of associating several different photochromic compositions having complementary absorption ranges in order to extend the absorption range of the assembly.

The present invention is based on the discovery that one can increase the range of absorption of a single spiropyran compound in its colored modification by introducing two spiropyran groups in the same molecule of the photochromic compound.

One object of the present invention is accordingly dispiropyran compounds, that is compounds containing two spiropyran functions in their molecule.

Other objects are a method of producing such compounds and a method of their utilization.

The photochromic dispiropyrans of this invention are represented by the following general formula:

Formula 2

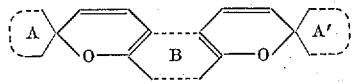

in which B represents a mono- or polyaromatic group containing such radicals as phenyl, diphenyl, stilbyl, napthyl, etc., which may be substituted, and A and A′ represent divalent radicals obtained by the removal of two atoms of hydrogen from the methylene group of a methylene compound in which the methylene group is fixed in a heterocycle of 5 or 6 members including one or more hetero atoms, such as N, S or O, the heterocycle itself being bound to one or more aromatic rings. The following radicals may be mentioned as examples of the systems A and A′:

Formula 3

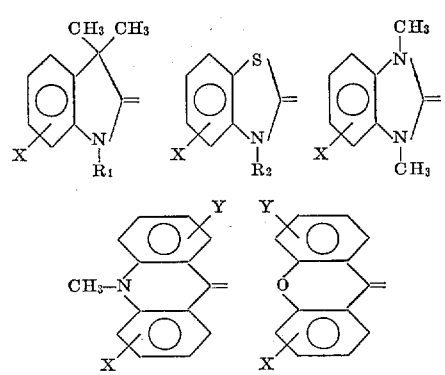

in which X and Y represent halogens or the usual substituents such as H, $CH_3$, $C_2H_5$, $C_6H_5$, $CH_3CO$, $CH_3O$, $NO_2$, CN, $CH_3COO$, $CF_3$, and $R_1$ and $R_2$ represent monovalent aliphatic, aromatic, or arylaliphatic hydrocarbon radicals such as $CH_3$, $C_6H_5$, $CH_3C_6H_4$, etc.

The process of synthesis of these novel dispiropyran compounds comprises reacting a mono- or polynuclear aromatic dihydroxy dialdehyde with a methylene compound as described above, that is comprising a methylene group fixed in a heterocycle of 5 or 6 elements which is bound to one or several aromatic rings.

This reaction can be represented as follows:

Reaction 1

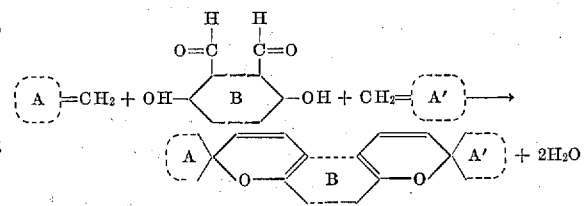

This condensation is effected very simply by bringing into contact the two reactants in a stoichiometric ratio, that is two molecules of the methylene compound to one molecule of the aromatic dihydroxy dialdehyde.

The reaction is preferably carried out in a solvent for the two reactants such as alcohol, an aromatic hydrocarbon, tetrahydrofuran, etc. Heating in general accelerates the condensation but is not essential. The separation from the reaction mixture of the dispiropyran compound of the invention may be effected in various ways as by precipitation or by evaporation of the reaction solvent.

Applicant has discovered that one obtains particularly useful photochromic dispiropyran compounds starting with the following aromatic dihydroxydialdehydes:

diformyl-1,4 dihydroxy-2,5 benzene
diformyl-1,3 dihydroxy-4,6 benzene
diformyl-3,3' dihydroxy-4,4' diphenyl
diformyl-1,5 dihydroxy-2,6 naphthalene.

As methylene compounds to condense with these dihydroxydialdehydes one may choose derivatives of indolins which, as is well known, have good stability towards light. In particular, one may use advantageously trimethyl-1,3,3 methylene-2 indolin, which is commercially available and has the following formula:

Formula 4

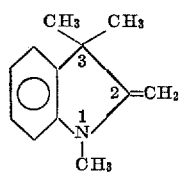

One may also use other derivatives of indolin such as, for example:

Formula 5

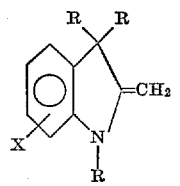

in which X is as defined above and R can be $CH_3$, $C_2H_5$, $C_6H_5$, etc.

PREPARATION OF THE STARTING MATERIALS (1) Methylene compounds derived from indolin The preparation of these derivatives is known and certain of them have even been commercialized, such as the trimethyl-1,3,3 methylene-2 indolin mentioned above.

The schemes of synthesizing the simplest of these compounds may be recapitulated as follows:

Reaction 2

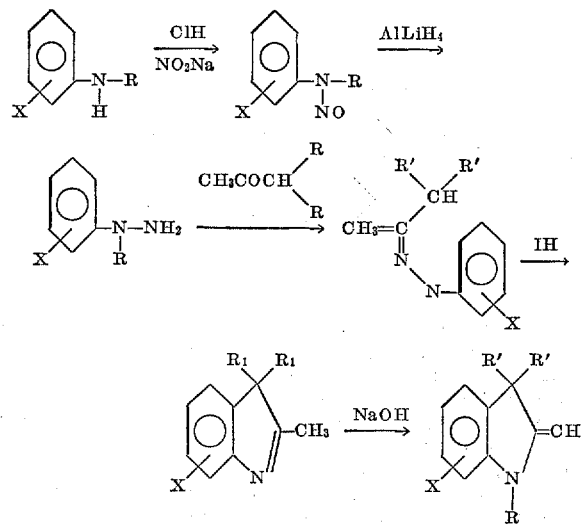

R and R' being aliphatic, aromatic or arylaliphatic radicals. This route is followed particularly when R is $C_6H_5$.

Reaction 3

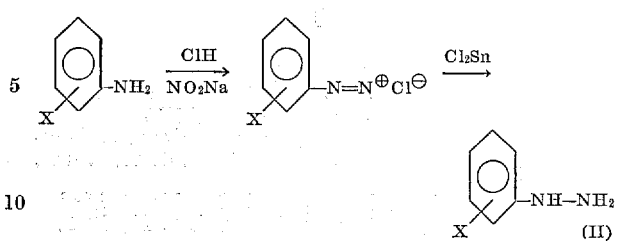

This substituted hydrazine can be further treated by either of two different methods (a) or (b):

Reaction

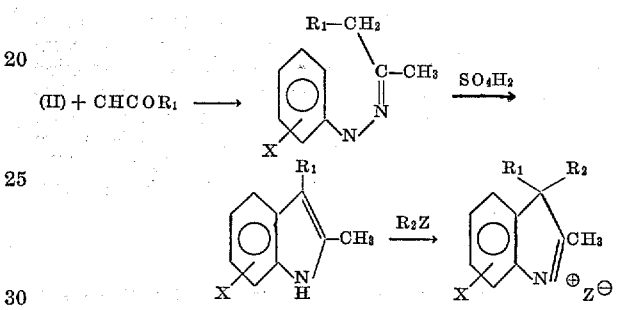

$R_1$ and $R_2$ being aliphatic, aromatic or arylaliphatic hydrocarbon radicals and Z being a halogen.

This route is suitable for example when $R_1=R_2=CH_3$.

Reaction 5

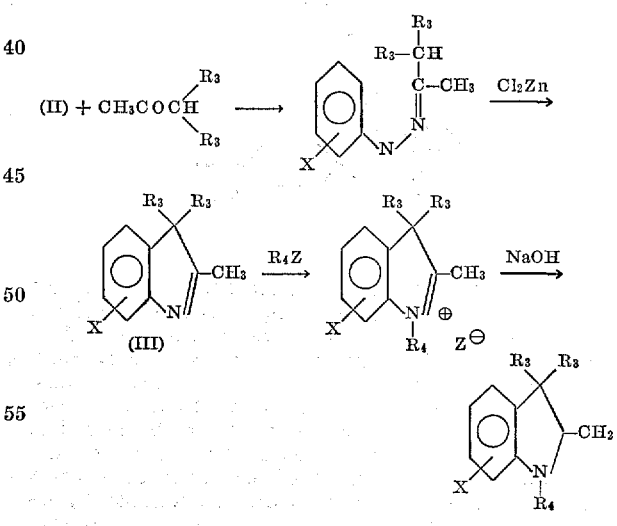

Z being a halogen and $R_3$ and $R_4$ being aliphatic aromatic or arylaliphatic hydrocarbon radicals.

This route is useful because, starting with intermediate product (III) it permits the synthesis of a whole series of N-substituted products.

(2) The dihydroxydialdehydes

The synthesis of diformyl-1,4-dihydroxy-2,5-benzene is known (see Bernatek and Thorensen—Acta Chem. Scand., 1955-9-743 and Burton, Clark and Gray, J. Chem. Soc., 1965, 441).

The diformyl-1,5 dihydroxy-2,6 naphthalene is also known and has been prepared by the method of Carl Berres (German Pat. 952,629).

The diformyl-1,3 dihydroxy-4,6 benzene can be prepared by the following synthesis:

Formula 6

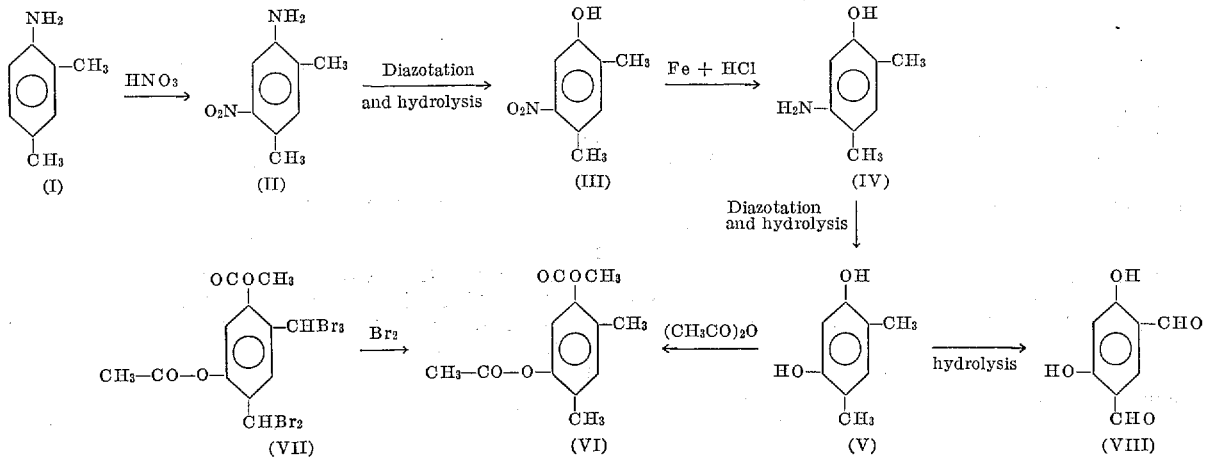

These reactions are carried out as follows:

Dimethyl-2,4 nitro-5 aniline (II)

Reactants: G.
Dimethyl-2,4 aniline (I) ------------------ 300
Sulfuric acid, concentrated ---------------- 2,430
Nitric acid, d.=1.47 ---------------------- 165

The dimethyl-2,4 aniline is disolved in the sulfuric acid, the solution cooled to 0° C. and the nitric acid added slowly while keeping the temperature at 0° C. The reaction mixture is then hydrolyzed by pouring on 5 kg. ice. Compound II appears as a yellow precipitate which is filtered off, washed until the washings are neutral. The precipitate recrystallized once from ethanol, has a melting point of 123° C. Yield 227 g., 56 percent.

Dimethyl-2,4 nitro-5 phenol (III)

Reactants: G.
Dimethyl-2,4 nitro-5 aniline (II) ------------ 173
Sulfuric acid, concentrated ---------------- 520
Sodium nitrite ---------------------------- 73

In a 10 liter beaker 520 g. concentrated sulfuric acid is mixed with 1,040 g. water and the dimethyl-2,4 nitro-5 aniline (II) added slowly. The sulfate of the amine precipitates. To the mixture is added 2,600 g. ice and the sodium nitrite as a saturated solution is introduced drop by drop while holding the temperature between 0° and +5° C. The resulting solution of diazonium salt is filtered and added drop by drop to a mixture of 2,000 g. concentrated sulfuric acid and 1,640 cc. water at 80° C. This temperature is maintained for one hour after completion of the addition and the mixture then allowed to cool. Dimethyl-2,4 nitro-5 phenol (III) precipitates and is filtered off. Yield, 176 g. crude product.

Dimethyl-2,4 amino-5 phenol (IV)

Reactants:
Dimethyl-2,4 nitro-5 phenol (III)—175 g.
Ethanol, 95 percent—950 cc.
Hydrochloric acid, concentrated—64 cc.
Iron filings—254 g.

The dimethyl-2,4 nitro-5 phenol (III) is dissolved in the alcohol, the hydrochloric acid added and the liquid boiled. The iron filings are added, while energetically stirring the mixture, in portions of about 10 g. each and the boiling continued for 5 hours under a reflux condenser. Animal charcoal is then added and the mixture filtered hot. The filtrate is concentrated to about 600 cc. and saturated with gaseous HCl whil cooling. The hydrochloride of dimethyl-2,4 amino-5 phenol (IV) precipitates and is filtered off. The filtrate is again saturated with gaseous HCl and a second yield of the hydrochloride (IV) obtained. The final yield is 167 g. of the hydrochloride (IV).

Dimethyl-4,6 resorcinol (V)

Reactants:
Hydrochloride of (IV)—120 g.
Sulfuric acid, 10 percent—6,000 cc.
Cracked ice—1,500 g.
Sodium nitrite—48 g.

In a 10 liter beaker the hydrochloride of (IV) is dissolved in 1,500 cc. of 10 percent sulfuric acid while heating to 70° C. The solution is rapidly cooled by the addition of 1,500 g. ice, and the sodium nitrite in saturated solution is added drop by drop while holding the temperature at 0° C. The solution of the diazonium salt is filtered and introduced in small amounts into 4,500 cc. of a boiling solution of 10 percent sulfuric acid. After cooling the dimethyl-4,6 resorcinol is extracted several times with ether, the extracts combined, washed with water and dried with anhydrous sodium sulfate. After evaporation of the ether, the residue is distilled to produce 38 g. of (V)—a 40 percent yield.

Diacetoxy-1,3 dimethyl-4,6 benzene (VI)

Reactants:
Dimethyl-4,6 resorcinol (V)—38 g.
Acetic anhydride—380 g.
Sulfuric acid, concentrated—3 drops.

The reactants are mixed and refluxed for 1½ hours. The mixture is then concentrated under vacuum to about 100 cc. and poured on ice. Diacetoxy-1,3 dimethyl-4,6 benzene precipitates. It is filtered off and recrystallized from petroleum ether to give 27 g. of a product melting at 70° C. Yield, 45 percent.

Diacetoxy-1,3 di(dibromomethyl)-4,6 benzene (VII)

Reactants:
Diacetoxy-1,3 dimethyl-4,6 benzene—25 g.
Bromine—73 g.
Carbon tetrachloride—3,700 cc.

The diacetate (VI) is dissolved in the carbon tetrachloride. While being boiled the reaction mixture is subjected to the radiation of a U.V. lamp and bromine is introduced for 5 hours in the vapor phase with the aid of nitrogen as a carrier gas. The mixture is evaporated to dryness. Recrystallization from chloroform gives 25 g. of colorless crystals melting at 142°–143° C. Yield, 41 percent.

Diformyl-1,3 dihydroxy-4,6 benzene (VIII)

Reactants:
Diacetoxy-1,3 di(dibromomethyl)-4,6 benzene (VII)—24 g.
Ethanol—2,400 cc.
Hydrochloric acid, concentrated—120 cc.

The mixture of reactants is refluxed for three hours, then concentrated under reduced pressure to 450 cc. and allowed to cool. The dialdehyde (VIII) precipitates. It is filtered off, washed with cold water and recrystallized from 88 percent aqueous dioxane. Six grams of white crystals melting at 190° C. are obtained. Yield, 80 percent. The nuclear magnetic resonance spectrum confirms the structure of the compound.

The diformyl-3,3' dihydroxy-4,4' diphenyl (Formula (VI') below) can be prepared in the following way.

to refluxing temperature, a few drops of sulfuric acid are added to catalyze the reaction, and the refluxing maintained for 2 hours. After cooling, the liquid is poured on ice and filtered. A tarry product is obtained which is purified with difficulty by successive passages over charcoal and alumina and recrystallization from $CCl_4$. The yield is 9 g., capillary melting point 134° C.

Micro analysis: Calculated (percent): C, 72.48; H, 6.04. Found (percent): C, 72.47; H, 5.89.

Diacetoxy-4,4' dibromomethyl-3,3' diphenyl (V)'

Reactants:
Compound (IV)'—9 g.
Bromine—7 cc.
$CCl_4$, dry—1,400 cc.

Nine g. compound (IV)' is dissolved in 1,400 cc. dry carbon tetrachloride, the solution is refluxed and irradiated

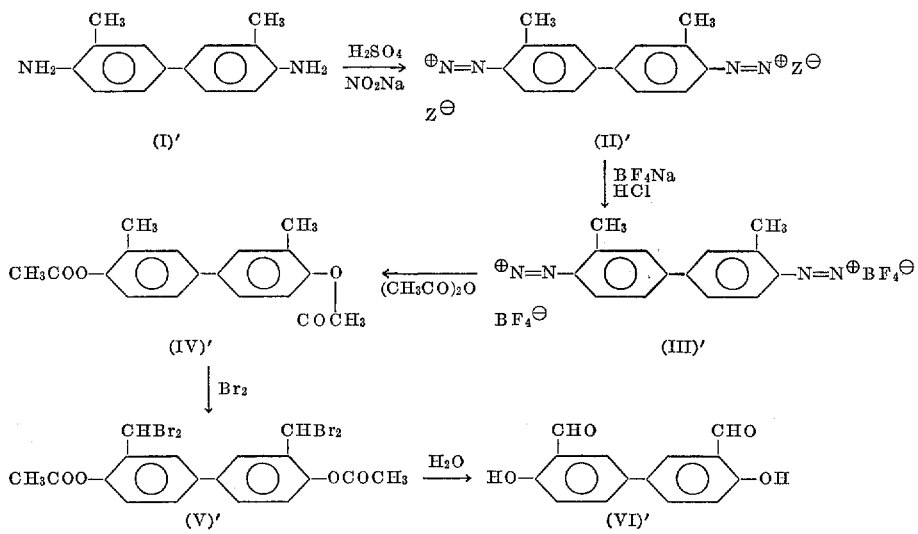

These reactions are carried out as follows:

Reactants:
O-tolidine (I)—42.4 g.
$H_2SO_4$, 100 percent—98 g.
$H_2O$—500 cc.
$NaNO_2$—30 g.
$BF_4Na$—48 g.
HCl, concentrated—40 cc.
Acetic anhydride—730 cc.

Diazotization

The sulfuric acid, 400 cc. water and the O-tolidine are intrdouced into a 1 liter round flask equipped with three tubulatures, a cooling device, and a central stirrer. The mixture is heated to 80° C. to speed dissolution, then cooled to 0° C. The sodium nitrite is added as a saturated aqueous solution while the temperature is held at 0° C. The solution of the diazo salt (II)' is filtered to remove insolubles.

Formation of the difluoborate (III)'

The diazo solution (II)' is then added to an aqueous sodium fluoborate solution (48 g. $BF_4Na$, 40 cc. concentrated HCl and 1000 cc. $H_2O$) at 0° C. and the temperature is held at 0° C. The difluoborate precipitates as a white solid which is washed with ice water, methanol and ether, and dried. Yield 73.5 g.

Diacetoxy-4,4' dimethyl-3,3' diphenyl (IV)'

To a 2 liter single-neck round flask equipped with a straight condenser are added 73.5 g. of the difluoborate (III)' and 730 cc. acetic anhydride. The mixture is heated with two HPF Philips lamps. Bromine vapor with nitrogen as a carrier gas is introduced into the solution for 5 hours. On concentration of the solution to 300 cc. a precipitate appears which is filtered off and recrystallized from ethyl acetate. Yield 12 g. The product is used as is.

Diformyl-3,3' dihydroxy-4,4' diphenyl (VI)'

Reactants:
Compound (V)'—10 g.
Ethyl alcohol, 95%—500 cc.
Hydrochloric acid—28 cc.

The reactants are introduced into a one liter single-neck flask equipped with a condenser and refluxed for 2 hours. Product (VI)' precipitates on cooling, is filtered off and washed with ice water. Yield 3.5 g., melting point 236° C.

The spectrum of nuclear magnetic resonance confirms the structure of the product.

As stated above, the photochromic dispiropyran derivatives of this invention are obtained by the reaction of one molecule of a dihydroxy dialdehyde, for example, of dialdehydediphenol, with two molecules of a monomethylene compound, particularly those described above which are derivatives of indoline. The reaction is carried out, for example, in an alcoholic medium (methanol) in the presence of tracers of piperidine. The reaction mixture is refluxed for a period which may range from several minutes to several hours. The photochromic product crystallizes on cooling, is dried and purified by recrystallization from a solvent.

Applicant has prepared in this way, for example, dispiropyran compounds of the general formula:

Formula 7

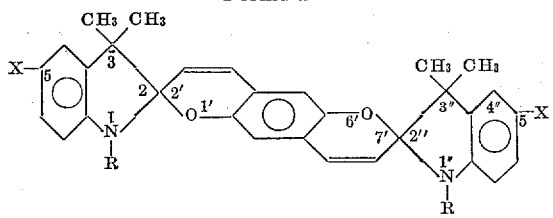

in which X represents H, Cl or Br, and R represents $CH_3$ or $C_6H_5$.

The names of these compounds are the following:

(1) Trimethyl-1,3,3 indoline 2-spiro-2 (dioxa-1',6') anthracene 7'-spiro-2" trimethyl-1",3" indoline (X=H R=$CH_3$)
(2) Chloro-5 trimethyl-1,3,3 indoline 2-spiro-2' (dioxa-1',6') anthracene 7'-spiro-2" chloro-5" trimethyl-1", 3", 3" indoline (X=Cl R=$CH_3$)
(3) Bromo-5 trimethyl-1,3,3 indoline 2-spiro-2' (dioxa-1',6') anthracene 7'-spiro-2" bromo-5" trimethyl-1", 3",3" indoline (X=Br R=$CH_3$)
(4) Phenyl-1 dimethyl-3,3 indoline 2-spiro-2' (dioxa-1', 6') anthracene 7'-spiro-2" phenyl-1" dimethyl-3",3" indoline (X=H R=$C_6H_5$)

Also the compound having the following formula:

Formula 8

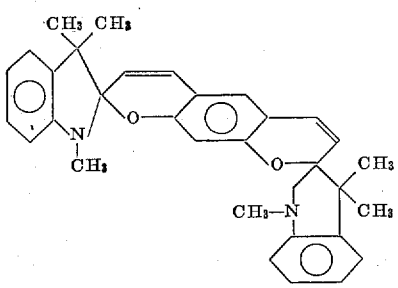

the name of which is:

(5) Trimethyl-1,3,3 indolin 2-spiro-2' (dioxa-1',9') anthracene 8'-spiro-2" trimethyl-1",3",3" indoline.

Furthermore, the compounds having the following structures:

Formula 9

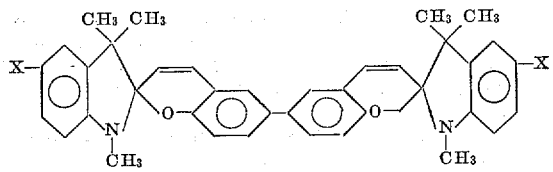

in which X=hydrogen or chlorine. Those compounds can be called:

(6) Bi-(trimethyl-1,3,3 indoline 2-spiro-2' benzo (b) pyran-6').
(7) Bi-(chloro-5 trimethyl-1,3,3 indoline 2-spiro-2' benzo (b) pyran)6'.

And further the compound having the formula:

Formula 10

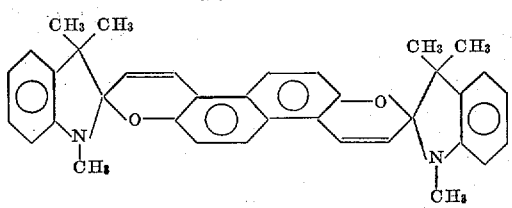

(8) Trimethyl-1,3,3 indoline 2-spiro-3' (dioxa-4',10') chrysene 9'-spiro-2" trimethyl-1",3",3" indoline.

The eight above compounds decompose without melting in the neighborhood of 200°–250° C. Micro analysis and the study of the nuclear magnetic resonance spectrum confirm the structure proposed above.

The photochromism of these spiropyran compounds has been studied both in solution and in semi-rigid media.

(a) Photochromism in solution

A one-tenth percent solution in toluene is prepared of the compound to be studied and this is irradiated at 0° C. for 10 seconds with a type SP 500 Philips mercury lamp. The color both before and after irradiation is noted as well as the time required for return to the initial color.

The results are as follows:

For all the above listed compounds except No. 5, the solution on irradiation changes from colorless to bluegreen. The time required for decoloration is equal to or less than one second. Compound No. 5 is not photochromic under these conditions.

(b) Photochromism in semi-rigid media

A sheet of polyvinyl butyral plasticized with butyl sebacate, about 0.5 mm. thick, is immersed for from 3 to 5 minutes in a 5 percent benzene solution of the compound under study; 5 percent butyl sebacate is added to the solution. The thus treated sheet is dried to remove the benzene.

On irradiation under the same conditions as described under (a) above, all the samples except No. 5 change from colorless to blue-green. The time necessary for decoloration varies from one to ten seconds.

Sample No. 5 exhibits a speed of coloration and decoloration so great that it cannot be judged under the conditions applied to the other samples. However, it has been found that this compound No. 5 in toluene solution becomes colored when exposed to an ordinary 300 joules photoflash and returns immediately to its colorless state.

The photochromic dispiropyran compounds of this invention can be employed either in solution in a solvent or in a semi-rigid medium such, for example, as a varnish or a sheet of transparent plastic material for making optical devices of variable transmission, such, for example, as the lenses of sun glasses for protection against solar radiation and glare.

As many apparently widely different embodiments of the present invention may be made without departing from the spirit and scope thereof, it is to be understood that the invention is not limited to the specific embodiments.

What is claimed is:

1. A dispiropyran compound having photochromic properties of fast change on exposure to radiation and reversion of color on removal of radiation of the formula

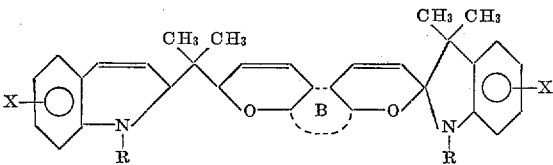

in which X represents one of the group consisting of H, halogen, $CH_3$, $C_2H_5$, $CH_3CO$, $CH_3O$, $NO_2$, CN, $CH_3COO$, NO and $CF_3$, R represents a radical from the group consisting of $CH_3$, $C_2H_5$, $C_6H_5$, and $C_6H_4CH_3$, and B represents an aromatic cyclic system of the group consisting of phenyl, diphenyl and naphthyl.

2. Trimethyl - 1,3,3 indoline 2 - spiro - 2'(dioxa-1',6') anthracene 7'-spiro-2" trimethyl-1",3",3" indoline.

3. Chloro - 5 trimethyl - 1,3,3 indoline 2 - spiro - 2' (dioxa - 1',6') anthracene 7' - spiro - 2" chloro - 5" trimethyl-1",3",3" indoline.

4. Bromo - 5 trimethyl - 1,3,3 indoline 2 - spiro - 2' (dioxa - 1',6') anthracene 7' - spiro - 2" bromo - 5" trimethyl-1",3",3" indoline.

5. Phenyl - 1 dimethyl - 3,3 indoline 2 - spiro - 2' (dioxa - 1',6') anthracene 7' - spiro - 2" phenyl - 1" dimethyl-3",3" indoline.

6. Trimethyl - 1,3,3 indoline 2 - spiro - 2' (dioxa - 1',9') anthracene 8' - spiro - 2" trimethyl - 1",3",3" indoline.

7. Bi - (trimethyl - 1,3,3 indoline 2 - spiro - 2' benzo (b) pyran)-6'.

8. Bi - (chloro - 5 trimethyl - 1,3,3 indoline 2 - spiro-2'-benzo(b)pyran)-6'.

9. Trimethyl - 1,3,3 indoline 2 - spiro - 3' (dioxa - 4', 10') chrysene 9' - spiro - 2" trimethyl - 1",3",3" indoline.

References Cited
UNITED STATES PATENTS

| | | | |
|---|---|---|---|
| 3,124,584 | 3/1964 | Weissel | 260—283 |
| 3,231,584 | 1/1966 | Berman et al. | 260—326.11 |
| 3,290,331 | 12/1966 | Taylor et al. | 260—326.11 |
| 3,325,499 | 6/1967 | Poos | 260—294 |

ALTON D. ROLLINS, Primary Examiner

J. A. NARCAVAGE, Assistant Examiner

U.S. Cl. X.R.

117—34; 252—300; 260—279, 304, 309.2, 335, 479, 600